United States Patent
Willis et al.

(10) Patent No.: US 10,333,860 B2
(45) Date of Patent: *Jun. 25, 2019

(54) CLOUD COMPUTING SYSTEM AND METHOD UTILIZING UNUSED RESOURCES OF NON-DEDICATED DEVICES

(71) Applicant: LeoNovus USA, Sunnyvale, CA (US)

(72) Inventors: Daniel Willis, Sunnyvale, CA (US); Paul Master, Sunnyvale, CA (US); Gordon Campbell, Sunnyvale, CA (US); Sean O'Hagan, Ottawa (CA); Derek Noble, Kanata (CA)

(73) Assignee: LEONOVUS USA, Sunnyvale, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 14/327,729

(22) Filed: Jul. 10, 2014

(65) Prior Publication Data

US 2015/0020132 A1 Jan. 15, 2015

Related U.S. Application Data

(60) Provisional application No. 61/844,448, filed on Jul. 10, 2013.

(51) Int. Cl.
*H04L 12/917* (2013.01)

(52) U.S. Cl.
CPC ................... *H04L 47/76* (2013.01)

(58) Field of Classification Search
CPC ... H04L 47/76; H04N 21/6125; H04N 21/438

(Continued)

(56) References Cited

U.S. PATENT DOCUMENTS 8,275,827 B2   9/2012  Hubbard
2002/0184451 A1* 12/2002  Dovi ..................... H04L 69/329
                                                              711/148

(Continued)

FOREIGN PATENT DOCUMENTS

WO       2012042509 A1    4/2012
WO    WO2012/051539 A2    4/2012
WO       2013052601 A1    4/2013

OTHER PUBLICATIONS

Federal Institute of Industrial Property; International Search Report and Written Opinion; dated Dec. 4, 2014; (8 pages); Moscow, Russia.

(Continued)

*Primary Examiner* — Nicholas R Taylor
*Assistant Examiner* — Meng Vang
(74) *Attorney, Agent, or Firm* — Emerson, Thomson & Bennett, LLC; Roger D. Emerson

(57) ABSTRACT

In accordance with a method a plurality of subscriber systems are provided, the systems being coupled via a Wide Area Network (WAN) and comprising a first subscriber system. The first subscriber system has processing and non-volatile storage and is suitably programmed for providing a subscriber service to a first subscriber. The first system is disposed in an unsecured location, which is associated with the first subscriber. Subsequently, the subscriber service is provided to the first subscriber. Separately, a task is provided to the first subscriber system via the WAN and is executed on the first subscriber system. An activity record for the execution of the task is logged, based on an amount of at least one of the processing and the non-volatile storage consumed on the first subscriber system during execution of the task.

25 Claims, 11 Drawing Sheets

(58) Field of Classification Search
USPC .......................................................... 709/11
See application file for complete search history.

(56) References Cited

U.S. PATENT DOCUMENTS

| | | | |
|---|---|---|---|
| 2003/0046396 A1 | 3/2003 | Richter et al. | |
| 2003/0174648 A1* | 9/2003 | Wang | H04L 65/1013 370/235 |
| 2007/0124415 A1* | 5/2007 | Lev-Ran | H04L 12/583 709/217 |
| 2008/0154798 A1* | 6/2008 | Valz | G06Q 30/02 705/400 |
| 2008/0310408 A1* | 12/2008 | Thompson | G06Q 30/02 370/386 |
| 2009/0007216 A1 | 1/2009 | Ku et al. | |
| 2009/0241150 A1* | 9/2009 | White | G06Q 30/00 725/91 |
| 2010/0058381 A1 | 3/2010 | Begeja et al. | |
| 2010/0223378 A1 | 9/2010 | Wei | |
| 2011/0016214 A1 | 1/2011 | Jackson | |
| 2011/0055498 A1 | 3/2011 | Kano | |
| 2011/0145875 A1 | 6/2011 | Kim | |
| 2011/0173328 A1 | 7/2011 | Park et al. | |
| 2011/0231887 A1* | 9/2011 | West | G11B 27/34 725/116 |
| 2012/0151077 A1 | 6/2012 | Finster | |
| 2012/0266060 A1* | 10/2012 | Roberts | G06F 17/30905 715/234 |
| 2012/0304169 A1 | 11/2012 | Anderson et al. | |
| 2012/0307635 A1 | 12/2012 | Kahn et al. | |
| 2013/0018999 A1 | 1/2013 | Merrill et al. | |
| 2013/0024496 A1 | 1/2013 | Krishnan et al. | |
| 2013/0104178 A1* | 4/2013 | Babu | H04N 21/4516 725/107 |
| 2013/0110778 A1 | 5/2013 | Taylor et al. | |
| 2013/0124720 A1 | 5/2013 | Wood et al. | |
| 2014/0325545 A1 | 10/2014 | Willis et al. | |

OTHER PUBLICATIONS

Cornell University Library, arxiv.org; Kirby et al.; An Approach to Ad hoc Cloud Computing; submitted Feb. 25, 2010; (8 pages); published at http://arxiv.org/pdf/1002.4738v1.pdf.

USPTO; International Search Report and Written Opinion for PCT/US2014/035261; dated Sep. 22, 2014; (17 pages); Alexandria, VA, US.

Kirby, Graham, et al., "An Approach to Ad hoc Cloud Computing", Distributed, Parallel, and Cluster Computing [online], Feb. 5, 2010 [ retrieved on Nov. 19, 2014]. Retrieved from the Internet: [URL; http://arxiv.org/pdf/1002.4728v1.pdf>, parts <<Abstract>>, <<1. Introduction>>, <<6. Conclusions>>.

* cited by examiner

CLOUD COMPUTING SYSTEM AND METHOD UTILIZING UNUSED RESOURCES OF NON-DEDICATED DEVICES

FIELD OF THE INVENTION

The invention relates generally to cloud-based processing and storage of data, and more particularly to a system and method for providing cloud-based processing and storage of data using the unused resources of non-dedicated devices.

BACKGROUND OF THE INVENTION

Cloud-based processing and storage of data has been available for several years. Cloud-based systems, such as for instance Amazon® Web Services (AWS), provide online computing and storage services for other web sites or client-side applications. In such systems the computing and storage services are billed to the client based on usage, which has given rise to the concept of "Elastic Computing." Elastic Computing is the ability of a cloud service provider to provision flexible computing power when and wherever required. The elasticity of these resources can be in terms of processing power, storage, bandwidth, etc. Current systems, of which AWS is typical, are based on data centers that are distributed throughout the world, grouped into distinct regions for providing services therein. For instance, AWS is located in eight geographical regions including Northern Virginia (US East), Northern California (US West), Oregon (US West), São Palo (Brazil), Ireland, Singapore, Tokyo and Sydney. Each region has multiple "Availability Zones," which are distinct data centers providing AWS services. Availability Zones are isolated from each other to prevent outages from spreading between Zones.

Traditional cloud-based computing and storage systems suffer from a number of disadvantages. In particular, it is costly to purchase the hardware and other infrastructure, such as for instance buildings, power distribution systems, air-conditioning systems etc., that are required to set up a data center. Of course, these costs are repeated to establish each of the multiple data centers within multiple regions around the world. Further, the ongoing cost to maintain and operate each data center is high, with the cost of power for servers and cooling systems making up a significant and increasing portion of the total cost of ownership. Traditional systems are also susceptible to service outages, which may affect a significant number of users within a geographical region and result in financial losses for the cloud computing provider.

It would be beneficial to provide a method and system that overcomes at least some of the above-mentioned limitations of the prior art.

SUMMARY OF THE INVENTION

In accordance with an aspect of the invention, there is provided a method comprising: providing by a first entity a plurality of systems, each system of the plurality of systems comprising at least one of a processing resource and a non-volatile storage resource, each system having a primary function other than providing a cloud-computing service to a second entity; determining an available aggregate amount of the at least one of the processing resource and the non-volatile storage resource that is other than being used by the plurality of systems for performing the primary function; performing a cloud-computing service for the second entity using at least a portion of the available aggregate amount of the at least one of the processing resource and the non-volatile storage resource; and invoicing to the second entity for performance of the cloud-computing service based on an amount of the available aggregate amount of the at least one of the processing resource and the non-volatile storage resource consumed during performance of the cloud-computing service.

In accordance with an aspect of the invention, there is provided a method comprising: providing by a first entity a Local Area Network (LAN) within a hotel property having a plurality of guest rooms, the LAN connected to a Wide Area Network (WAN); providing by the first entity a plurality of subscriber systems, comprising disposing a subscriber system within each guest room of the plurality of guest rooms, each subscriber system connected to the LAN and comprising at least one of a processing resource and a non-volatile storage resource, and each subscriber system having a primary function other than providing a cloud-computing service to a second entity; receiving user data from the second entity via the WAN; providing the received user data to at least one subscriber system of the plurality of subscriber systems via the LAN; performing a cloud-computing service for the second entity comprising at least one of processing the user data and storing the user data using the at least one of the processing resource and the non-volatile storage resource of the at least one subscriber system; and invoicing to the second entity for performance of the cloud-computing service based on an amount of the at least one of the processing resource and the non-volatile storage resource consumed during performance of the cloud-computing service.

In accordance with an aspect of the invention, there is provided a system comprising: a Local Area Network (LAN) that is in communication with a Wide Area Network (WAN); a plurality of systems associated with a first entity, each system coupled to the LAN and having an amount of an available resource that varies over time, each system supporting a primary function other than providing cloud-computing services to a second entity; a client system coupled to the WAN for making a request for a cloud-computing service, the cloud-computing service comprising at least one of processing and data storage using the available resources of the plurality of systems and outside of resources of the client system, and a resource allocator for: receiving from the client system the request for the cloud-computing service; providing a task to at least some systems of the plurality of systems to be performed thereby, using a portion of the available resources of the at least some systems of the plurality of systems, the task based on the request that is received from the client system; coordinating delivery to the client system of a result of performing the task by the at least some systems of the plurality of systems; and invoicing to the second entity for performance of the cloud-computing service based on the portion of the available resource of each of the at least some systems that is used during performance of the cloud-computing service.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
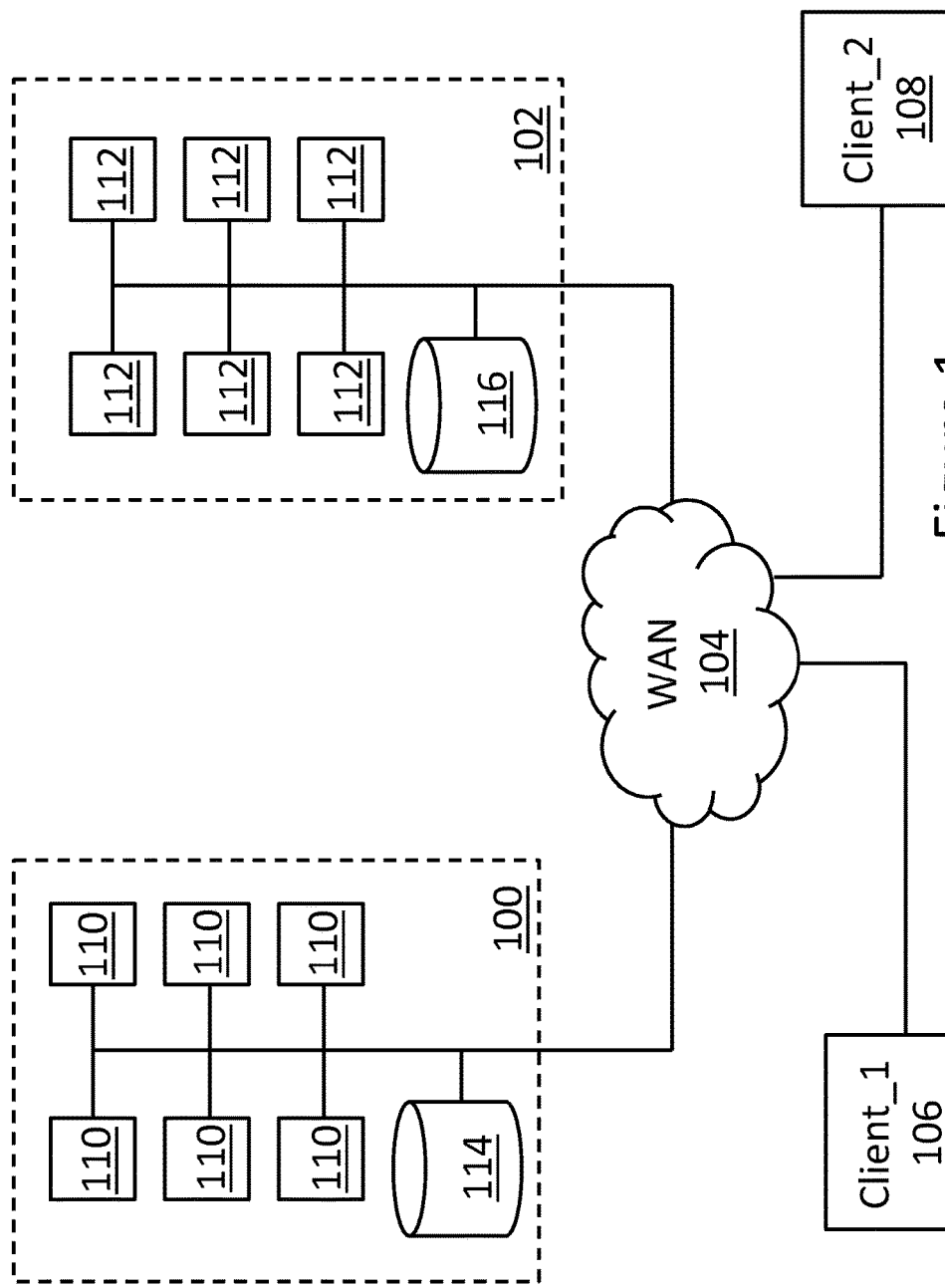
FIG. 1 is a simplified diagram showing a known cloud computing system.

Referring to FIG. 1, shown is a simplified diagram of a prior art cloud computing system. The system that is depicted in FIG. 1 is typical of known cloud computing systems, such as for instance the Amazon® Web Services (AWS) system. A first data center 100 and a second data center 102 are coupled to a Wide Area Network (WAN) 104, such as for instance the Internet. A first user system (Client_1) 106 and a second user system (Client_2) 108 are also coupled to the WAN 104. In the interest of clarity, various known components of the WAN 104 and of the communication systems through which the data centers 100 and 102 and the user systems 106 and 108 connect to the WAN are not shown in FIG. 1. Further, various systems that are necessary for the operation of the data centers 100 and 102, such as for instance cooling systems, power distribution systems, etc., are not shown in FIG. 1.

Each data center 100 and 102 includes a plurality of servers 110 and 112, respectively. The servers 110 are on a Local Area Network (LAN) at data center 100 and the servers 112 are on a Local Area Network (LAN) at data center 102. Additionally, each data center 100 and 102 includes mass storage devices, represented generally at 114 and 116, respectively. The servers 110 and mass storage 114 are maintained and serviced using not shown cooling and power distribution systems, personnel, etc. located at data center 100, whilst the servers 112 and mass storage 116 are maintained and serviced using not shown cooling and power distribution systems, personnel, etc. located at data center 102. For simplicity, it is assumed that data center 100 and data center 102 are located within a same region, and that a task provided from Client_1 or from Client_2 may be handled by either the data center 100 or the data center 102. Alternatively, the data centers and/or the user systems are located within different regions.

Referring still to FIG. 1, during use Client_1 provides a task via WAN 104 to a cloud-computing provider. The cloud-computing provider is implemented on a not illustrated server coupled to the WAN 104, or on the servers of one or both of data centers 100 and 102. The task is routed to an appropriate data center to be executed. For instance, the task is directed to data center 100 and appropriate processing and/or storage resources are allocated within data center 100 for executing the task. Client_1 is billed for execution of the task based on processing and/or storage resources consumed. Alternatively, the task is routed to data center 102. Further alternatively, Client_2 provides a task, which is routed to either data center 100 or data center 102. As will be apparent, providing data center 100 and data center 102 within the same region increases the cloud-computing provider's flexibility to route tasks from the same user, or from multiple users, based on the amount of resources that are required to execute the task and the amount of resources that are currently available at any given data center. Further, if there is a service interruption at one of the data centers 100 or 102 then the cloud-computing provider may direct tasks to the other one of the data centers 100 or 102. Unfortunately, it is very costly to establish and operate multiple dedicated data centers, and even with such redundancy it is not possible to eliminate service interruptions entirely.

Figure 2:
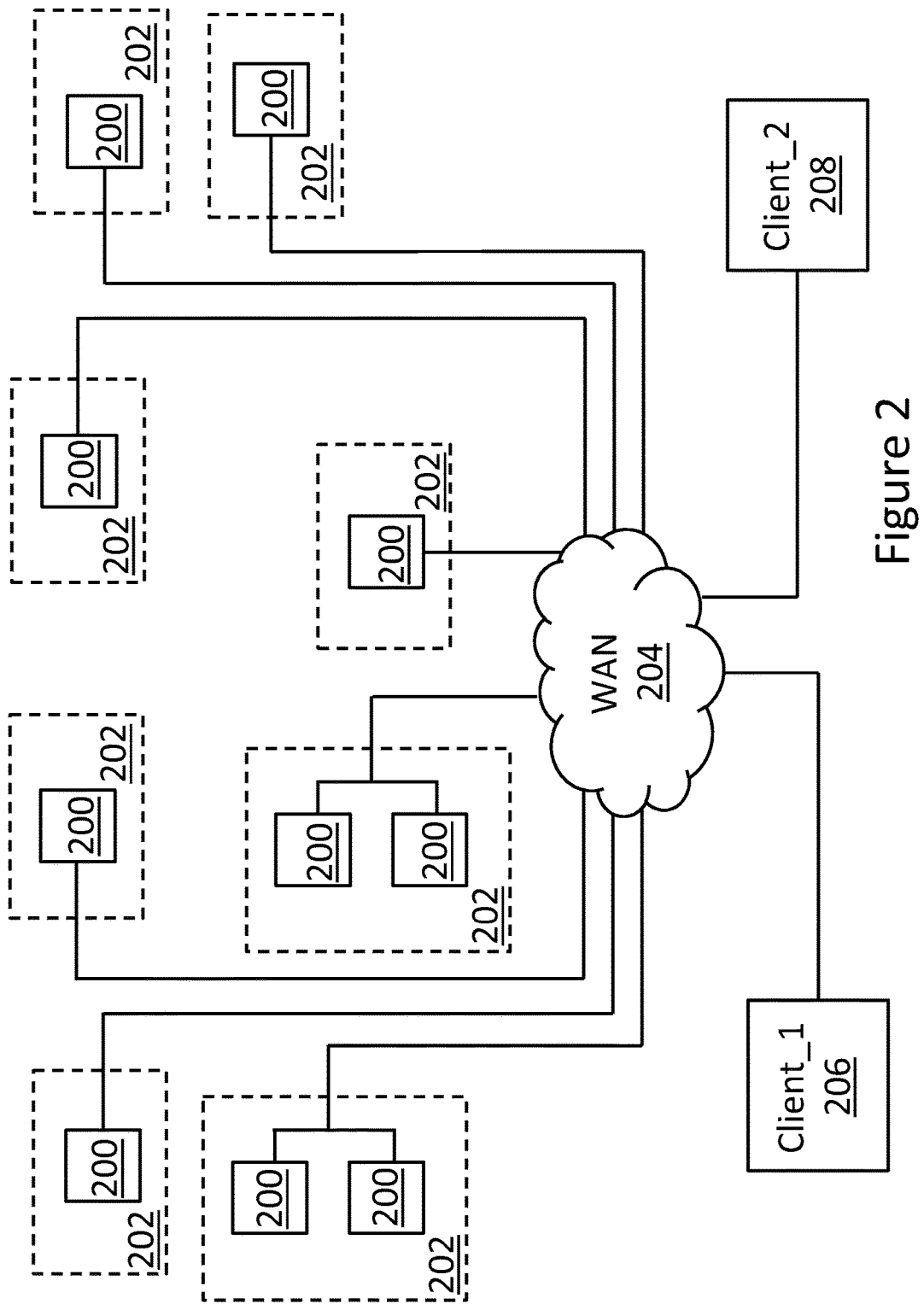
FIG. 2 is a simplified diagram showing a cloud computing system according to an embodiment of the invention.

Referring now to FIG. 2, shown is a simplified diagram of a cloud computing system in accordance with an embodiment of the invention. Each one of a plurality of subscribers to a content delivery service is provided with a consumer electronic device 200, which is disposed at a location associated with the subscriber. Optionally, some locations are provided with a plurality of consumer electronic devices 200, for instance to support different content delivery services or to support plural subscribers located at a same location. Each of the consumer electronic devices 200 is connected to Wide Area Network (WAN) 204, via a known data communication technology, such as for instance an asymmetric digital subscriber line. A first user system (Client_1) 206 and a second user system (Client_2) 208 are also coupled to the WAN 204. In the interest of clarity, various known components of the WAN 204 and of the communication systems through which the consumer electronic devices 200 and the user systems 206 and 208 connect to the WAN are not shown in FIG. 2.

In the present embodiment, the content delivery service is an Internet Protocol TV (IPTV) service, and the consumer electronic device 200 is a set-top box (STB) that is installed in each subscriber's home 202 for receiving media content via WAN 204, the media content for being displayed to the respective subscriber via a television or other similar device. A STB typically is an embedded PC with a processor and memory capable of decoding MPEG-2 or MPEG-4 encoded video, or video that is encoded using other codecs e.g., H.264 or H.265 etc., and simultaneously capable of dealing with the processor overhead relating to enforced encryption, etc. The duty of presenting the program guide and acting on input events from a user are small compared to the STB primary duties, i.e., digital signal processing. Optionally, the consumer electronic device 200 supports other content delivery services, such as for instance full web browser HTML and HTML5 service, either in addition to or instead of supporting the IPTV service. Some other specific and non-limiting examples of services that can be accessible from the STB include linear television services (e.g., broadcast or cable, etc.), hotel guest services (e.g., information, entertainment, Video-on-demand, interaction with hotel systems (e.g., scheduling a wake up call, making a purchase billed to the room, sending/receiving messages, etc.), and hospital patient/physician services (e.g., information, entertainment, social interaction/networking, education centered around recent diagnoses, patient record retrieval/modification/saving, etc.).

Figure 3:
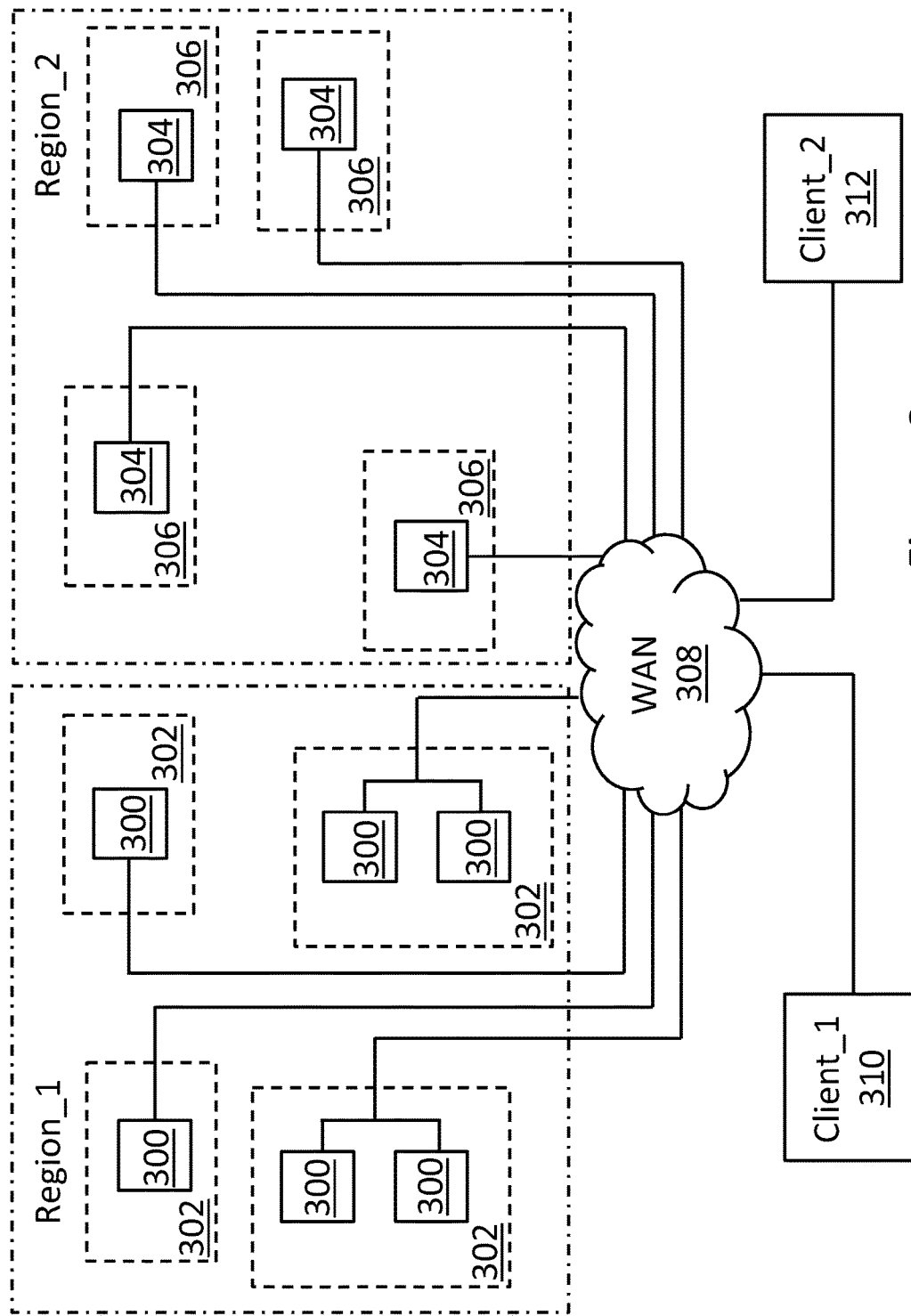
FIG. 3 is a simplified diagram showing a cloud computing system according to an embodiment of the invention.

Referring now to FIG. 3, shown is a simplified diagram of a cloud computing system in accordance with another embodiment of the invention. The system of FIG. 3 is similar to the system of FIG. 2, but each of the consumer electronic devices 300 and 304 is assigned to one of two different regions, Region_1 or Region_2. In particular, devices 300 are disposed within locations 302 that are grouped together to form Region_1 and devices 304 are disposed within locations 306 that are grouped together to form Region_2. The locations 302 are not necessarily all co-located within a defined geographical area, and similarly the locations 306 are not necessarily all co-located within a defined geographical area. For instance, the definition of different regions may be logical rather than geographic in nature. That being said, for reasons relating to network efficiency, it is preferable for the devices 300 or 304 within a same region to be located within a relatively small geographical area, such as for instance within a same city or within a same state/province/country. Assigning the devices 300 and 304 to different regions supports geo-diversity/control, political diversity/control, and even seismic diversity etc. resulting in stronger disaster recovery capabilities.

Referring still to FIG. 3, a first user system (Client_1) 310 and a second user system (Client_2) 312 are also coupled to the WAN 308. In the example that is shown in FIG. 3 it is assumed that Client_1 is in Region_1 and that Client_2 is in Region_1. Alternatively Client_1 and Client_2 are both in either Region_1 or Region_2, or Client_1 is in Region_2 and Client_2 is in Region_1. In the interest of clarity, various known components of the WAN 308 and of the communication systems through which the consumer electronic devices 300 and 304 and the user systems 310 and 312 connect to the WAN are not shown in FIG. 3.

In the present embodiment, the content delivery service is an Internet Protocol TV (IPTV) service, and the consumer electronic devices 300 and 304 are set-top boxes similar to the one that is described with reference to FIG. 2. Optionally, the consumer electronic devices 300 and/or 304 support other content delivery services, such as for instance full web browser HTML and HTML5 service, either in addition to or instead of supporting the IPTV service. Some other specific and non-limiting examples of services that can be accessible from the STB include linear television services (e.g., broadcast or cable, etc.), hotel guest services (e.g., information, entertainment, Video-on-demand, interaction with hotel systems (e.g., scheduling a wake up call, making a purchase billed to the room, sending/receiving messages, etc.), and hospital patient/physician services (e.g., information, entertainment, social interaction/networking, education centered around recent diagnoses, patient record retrieval/modification/saving, etc.).

Figure 4:
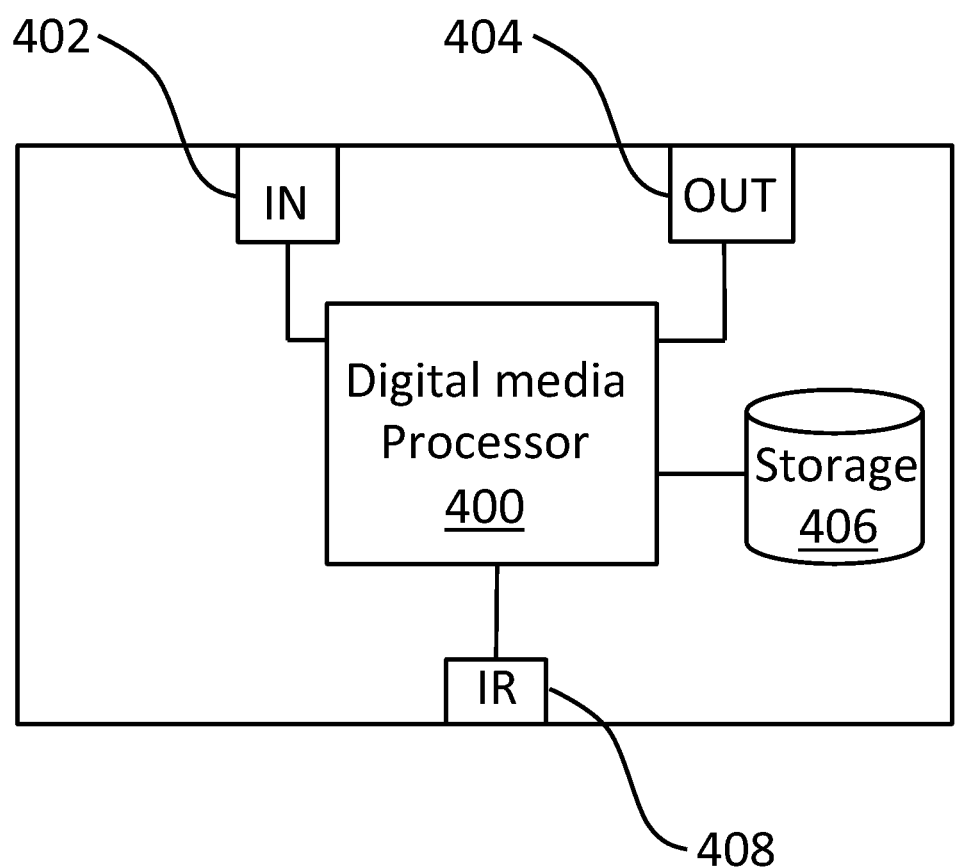
FIG. 4 is a simplified block diagram showing components of a consumer electronic device.

FIG. 4 is a simplified block diagram showing various components of the consumer electronic device 200, 300, 304, e.g., an Internet Protocol TV (IPTV) set top box (STB) for a subscription-based IPTV content delivery service. In this specific and non-limiting example, the STB includes a digital media processor 400 for processing data packets that are transmitted over a WAN and received at input interface 402. The digital media processor 400 comprises one or more processors for extracting data packets and for processing the resulting transport stream. The digital media processor 400 optionally is dedicated, i.e. a field programmable gate array (FPGA), central processing unit (CPU), graphics processor unit (GPU), hard codecs, etc. Processing the transport stream includes functions such as decoding, error correction, descrambling, and extracting of a specific program stream as selected by a user. The program stream is then divided into its elementary streams (video, audio, data and control), which are supplied to a compositor 404 to create a signal to be sent to a television or other similar device. The STB further includes storage 406, such as for instance a hard disk drive (HDD) or a solid-state memory or flash memory device. The capacity of storage 406 optionally is in the terabyte (TB) range or higher. Storage 406 supports personal video recorder (PVR) functionality, and/or stores the firmware and other software that is required to operate the STB. Optionally, the STB includes a sensor 408, e.g., an Infrared sensor, for receiving control signals from a user remote control device having a complementary transmitter. Further optionally, auxiliary processing and/or storage components (not shown) unrelated to the subscription-based content delivery service are provided within the STB.

The STB includes a finite amount of processing resources within the digital media processor 400 (and the optional auxiliary processing component if present), as well as a finite amount of storage resources within storage 406 (and the optional auxiliary storage component if present). More of the processing resources and/or storage resources are used during certain periods of time, such as for instance when the subscriber to the content delivery service is watching a program, than during other periods of time, such as for instance when at the subscriber is not watching a program. Depending on the resources that are provided within the STB, and the nature of the program that is being watched, some of the processing resources and/or storage resources may remain unused or available, even when the subscriber is watching a program. During any given day, there are expected to be blocks of time when the subscriber will not use the STB to access programs via the content delivery service. For instance, it is expected that most subscribers will not view programs during daytime work hours and during the late night through early morning hours. During such periods of inactivity, which may be mapped to each subscriber by monitoring viewing activity over a period of days or weeks, the processing resources and storage resources of the STB are underutilized. The systems that are shown in FIG. 2 and FIG. 3 allow tasks to be performed for other users unrelated to the subscriber, such as for instance Client_1 or Client_2, using the underutilized STB processing resources and/or storage resources. Each consumer electronic device 200 in FIG. 2, or consumer electronic device 300 or 304 in FIG. 3, is a STB similar to the one that is shown in FIG. 4. Of course, different STB models may be provided to different subscribers, such as for instance during the roll-out of new models or when different models are offered to subscribers at different costs, etc. Since the processing and storage characteristics of the different models are known, the instantaneous amount of unused processing resources and/or storage resources for any STB may be determined based on knowledge of the program requested by a subscriber associated with that STB.

Referring again to the system that is shown in FIG. 2, a cloud-computing provider, i.e. a broker of cloud-computing resources, coordinates the delivery of tasks from Client_1 and/or from Client_2 to one or more of the consumer electronic devices 200. In this specific and non-limiting example the cloud-computing provider is also the provider of the content delivery service. Optionally, the cloud-computing provider is also the provider of Internet service to the subscriber. Alternatively, the cloud-computing provider (broker), the provider of the content delivery service and the Internet service provider are separate entities.

The cloud-computing provider maintains a not illustrated server system that is connected to WAN 204, or alternatively the cloud-computing provider maintains a virtual server system that is itself distributed across the consumer electronic devices 200. The cloud-computing provider tracks the processing resources and/or storage resources that are available on each of the consumer electronic devices, which are always connected to the WAN and in communication with the cloud-computing provider. When a task is received from Client_1 or from Client_2, the cloud-computing provider determines one or more of the consumer electronic devices 200 having sufficient available processing resources and/or storage resources to execute the task, and subsequently provides the task to the one or more of the consumer electronic devices 200 for execution thereon. As such, each of the one or more consumer electronic devices 200 optionally performs only a portion of the task. Upon completion of the task, the cloud-computing provider returns a result to the task provider Client_1 or Client_2, and creates a billing/activity tracking record, which optionally includes providing an invoice to the task provider based on the amount of resources of the one or more of the consumer electronic devices 200 consumed during execution of the task. Optionally, executing of a task occurs during a period of time that overlaps with, or that is in parallel with, delivery of content to the one or more of the consumer electronic devices 200. When the task is performed in parallel with the primary function of the STB, e.g., during delivery of content to the subscriber associated with the STB, then performing the primary function has priority over performing the task. Alternatively, executing of a task occurs only during "idle time" when content is not being delivered to the one or more of the consumer electronic devices 200.

As will be apparent, some tasks may be performed using the resources of only a single consumer electronic device 200, or using the resources of a plurality of consumer electronic devices 200 cooperatively. For instance, storage of a small amount of user data or certain processing tasks may be performed using the resources of only a single consumer electronic device 200. On the other hand, storage of large amounts of data, storage of data according to a RAID process, or processing intensive tasks may require the resources of a plurality of consumer electronic devices 200. As such, it is not a requirement that any single STB is capable of performing an entire processing or storage task by itself.

Other optional features of the system that is shown in FIG. 2 include using different security protocols to transmit and/or store data relating to the content delivery service and user data relating to a provided task. For instance, data relating to television programming is transmitted to consumer electronic devices 200 via WAN 204 and stored on consumer electronic devices 200 in accordance with a first security protocol that is suitable in an IPTV ecosystem. User data, which is not associated with the content delivery service to which the subscribers subscribe, is transmitted to consumer electronic devices 200 via WAN 204 and stored on consumer electronic devices 200 in accordance with a second security protocol that is suitable in a cloud-computing ecosystem. The subscribers are unable to access the user data, and in fact the subscribers preferably are not even aware that a task is being executed at any given time.

In sum, the cloud-computing provider or broker coordinates flow of data including receipt of the task from a requestor (e.g., Client_1 or Client_2), delivery of the task to one or more consumer electronic devices 200 for execution thereon, receipt of a result of executing the task, and providing the result back to the requestor. Optionally, the flow of data is direct between the one or more consumer electronic devices 200 and the requestor (Client_1 or Client_2). Further, the cloud-computing provider monitors and logs cloud service operations and invoices the requestor based on the resources that are consumed during executing of the task. In the system of FIG. 2, tasks are performed for the requestor using processing and/or storage resources that are outside of the processing and/or storage resources of the requestor. That is to say, the tasks are performed for the requestor using the processing and/or storage resources associated with one or more subscribers to the content delivery service. The invoicing, by the cloud-computing provider, is to other than the subscribers to the content delivery service.

The system that is shown in FIG. 2 provides considerable flexibility in the provisioning of cloud-based computing services, and supports a broker-mediated or hypervisor mediated and cloud-computing environment. In particular, the nature of a processing task may be taken into account when providing the task to the devices 200. For instance, a highly parallelized process may be provided to any of the available devices 200 without regard to the processing speed thereof, and a highly serialized process may be provided to the available devices 200 that offer the fastest processing speed. The nature of a storage task may also dictate whether data is stored entirely within one device 200, or within a plurality of devices 200 using a RAID process or another similar process. In the system that is shown in FIG. 2, the locations 202 may be distributed across different countries and even across different continents. The nature of the storage task may dictate that the data cannot be stored within devices 200 that are located within certain specified countries or regions. Similarly, certain processing tasks may place restrictions on the countries in which the devices 200 can be located.

Cloud-computing services that are provided using the system of FIG. 2 can be implemented in a highly elastic fashion, since tasks may be distributed across a large number of devices 200. As the number of subscribers to the content delivery service grows, so too does the number of available devices 200. In order to incent new subscribers to join the service, and thereby increase the available processing resources and storage resources, the content delivery service provider optionally provides the devices 200 to subscribers without charge. The cost of the devices 200 is recovered over time as the available processing resources and/or available storage resources are used to perform tasks for other clients. Once the initial cost of installing the devices 200 has been recovered, the ongoing cost of implementing the system of FIG. 2 is small. In particular, each subscriber pays for the electricity that is required to power the device 200 even when tasks are being performed for other clients. Further, the devices 200 do not require cooling systems or other infrastructure that are required in traditional data centers. Once deployed, the system that is shown in FIG. 2 has a low cost of ownership and is highly scalable and elastic. Optionally, a portion of the invoiced amount is credited back to the subscribers as payment for making the resources of their device 200 available for performing other tasks. Further optionally, the service and/or equipment is offered at a reduced price based on anticipated revenues.

The system that is shown in FIG. 3 similarly provides considerable flexibility in the provisioning of cloud-based computing services, within each of a plurality of distinct regions. In addition to the features and advantages that are discussed with reference to FIG. 2, the system that is shown in FIG. 3 also provides redundancy by supporting storage of the same data in different regions for being accessed by clients within the same region. Further, network efficiency is improved since tasks that are received from a client in one region are routed to devices 300 or 304 within the same region.

Figure 5:
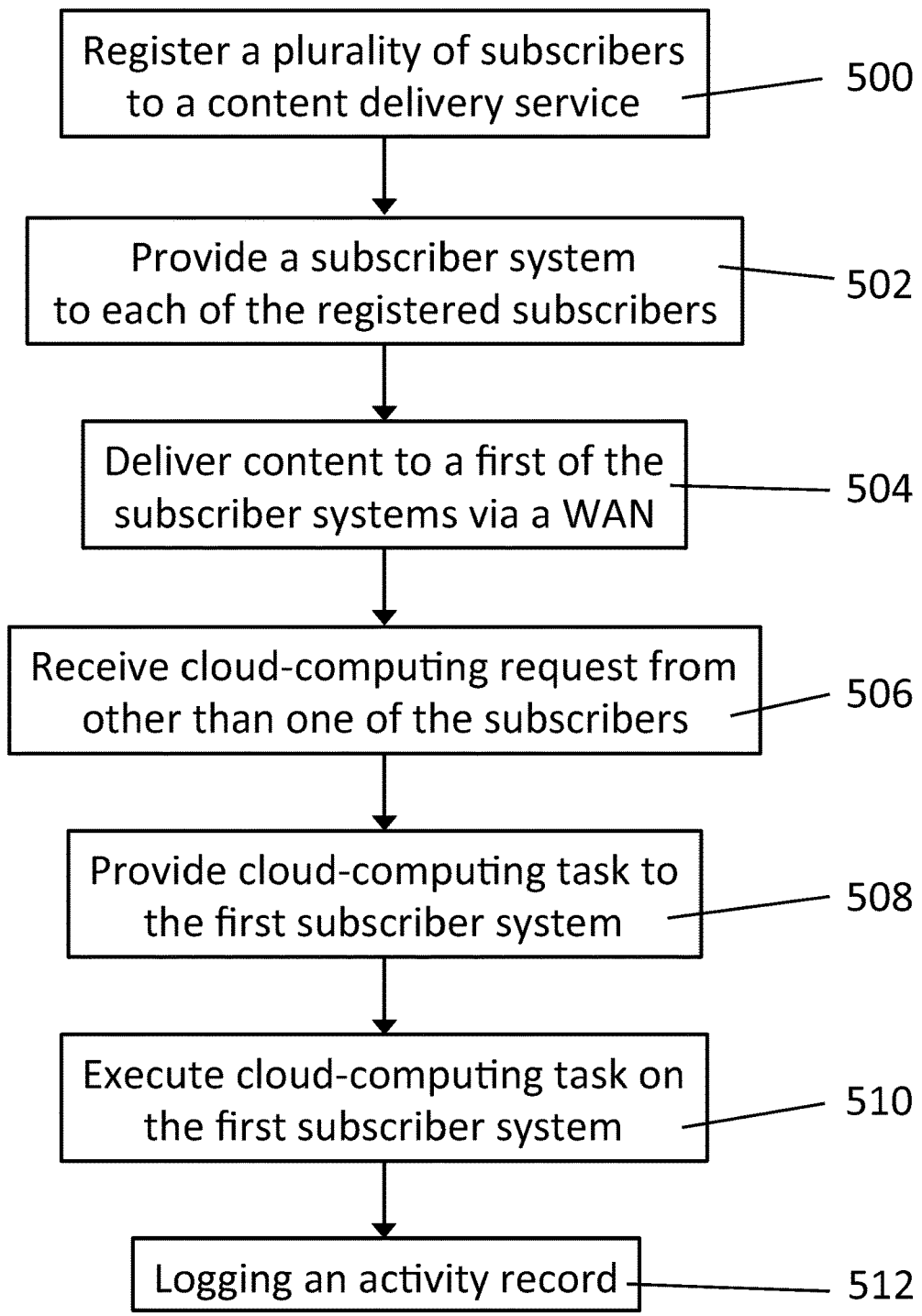
FIG. 5 is a simplified flow diagram for a method according to an embodiment of the invention.

Referring now to FIG. 5, shown is a simplified flow diagram for a method according to an embodiment of the invention. At 500 a plurality of subscribers is registered to a content delivery service. The content delivery service optionally is one or more of an IPTV service and an Internet service. Registering optionally includes signing each of the subscribers to a fixed-term contract or to a month-to-month contract. At 502, for each registered subscriber, the content delivery service provides a subscriber system at a location that is associated with the subscriber. For instance, the subscriber system is provided at the subscriber's residence and is coupled to a Wide Area Network (WAN), such as for instance via an asymmetric digital subscriber line. The provided subscriber system comprises at least one of a processing resource and a non-volatile storage resource for use in providing the content delivery service. At 504 content is delivered to a first subscriber system via the WAN. The content is delivered in response to a content delivery request received from a first subscriber, such as for instance selection of a program from a program guide using a remote control device or navigating to a specified web page using a browser. The delivery of the content, and processing of the delivered content for being displayed via a television or other similar device, consumes a portion of the at least one of the processing resource and the non-volatile storage resource of the first subscriber system. In this specific and non-limiting example the content delivery service provider is also a cloud-computing provider or a cloud-computing broker. Optionally, the content delivery service provider is also an Internet service provider. Alternatively, the cloud-computing provider (broker), the content deliver service provider and the Internet service provider are separate entities.

At 506 a cloud-computing task is received, the task being other than in accordance with the content delivery service and other than originating from any subscribers of the plurality of subscribers. For instance, the task originates from Client_1 or Client_2 in FIG. 2 or 3. Optionally, the task is received from a subscriber for execution other than by the subscriber's system. At 508 the task is provided to the first subscriber system. Providing the task to the first subscriber system includes making a determination that the first subscriber system has an available portion of the at least one of the processing resource and the non-volatile storage resource that is sufficient to execute the task. Optionally, the task is provided to the first subscriber during a period of time in which content is not being delivered by the content delivery service—idle time. During idle time nearly all of the at least one of the processing resource and the non-volatile storage resource is available to be used for other tasks. Alternatively, the task is provided to the first subscriber during a period of time in which content is being delivered by the content delivery service. In this latter case, a significant portion of the at least one of the processing resource and the non-volatile storage resource is being consumed to deliver the content, but unused resources are still available to be used for other tasks. At 510 the task is executed on the first subscriber system, using the unused at least one of the processing resource and the non-volatile storage resource thereof. Upon completion of the task, at 512 an activity record is logged. Optionally, logging an activity record includes invoicing for execution of the task based on an amount of the available or unused portion of the at least one of the processing resource and the non-volatile storage resource consumed during execution of the task. The invoicing is to other than the first subscriber, e.g., to Client_1 or Client_2 in FIG. 2 or 3.

Figure 6:
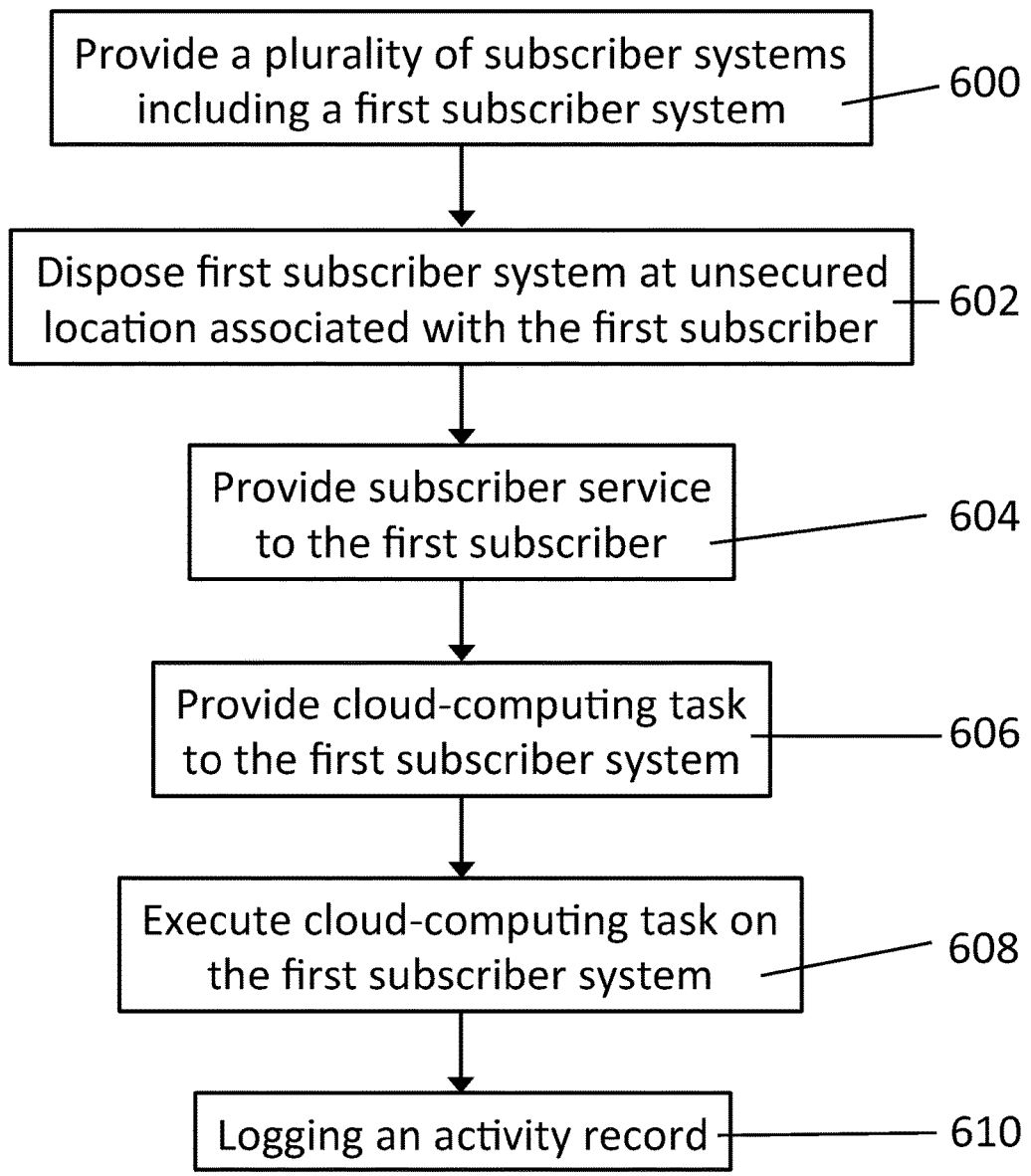
FIG. 6 is a simplified flow diagram for another method according to an embodiment of the invention.

Referring now to FIG. 6, shown is a simplified flow diagram for a method according to an embodiment of the invention. At 600 a plurality of subscriber systems is provided, including a first subscriber system, the subscriber systems being coupled via a Wide Area Network (WAN). The first subscriber system comprises processing and non-volatile storage and is suitably programmed for providing a subscriber service to a first subscriber. At 602 the first system is disposed in an unsecured location, the unsecured location associated with the first subscriber. For instance, the first subscriber system is disposed in the first subscriber's residence. In this context, the term unsecured implies that no special measures are provided to provide security to the subscriber system in addition to the pre-existing door locks and/or alarm systems that already exist at the location associated with the first subscriber. At 604 the subscriber service is provided to the first subscriber, e.g., requested content available via the subscriber service is provided to the first subscriber. The requested content is delivered in response to a content delivery request received from the first subscriber, such as for instance by selection of a program from a program guide using a remote control device. At 606 a cloud-computing task is provided to the first subscriber system via the WAN. The cloud-computing task comprises, for instance, at least one of processing and storage of user data, the user data unrelated to the subscriber service. At 608 the cloud-computing task is executed on the first subscriber system, using an amount of at least one of the processing and non-volatile storage thereof. Upon completion of the task, at 610 an activity record is logged. Optionally, logging an activity record includes invoicing for execution of the task based on the amount of at least one of the processing and the non-volatile storage consumed on the first subscriber system during execution of the task. The invoicing is to other than the first subscriber, e.g., to Client_1 or Client_2 in FIG. 2 or 3. Optionally, all processing tasks are obfuscated to maintain security of the overall process even when executed in unsecure locations. For example, data to be stored is encrypted to ensure that access to the physical media dose not provide access to the data, or only a portions of the entire algorithm is executed on the first subscriber system, etc.

Figure 7:
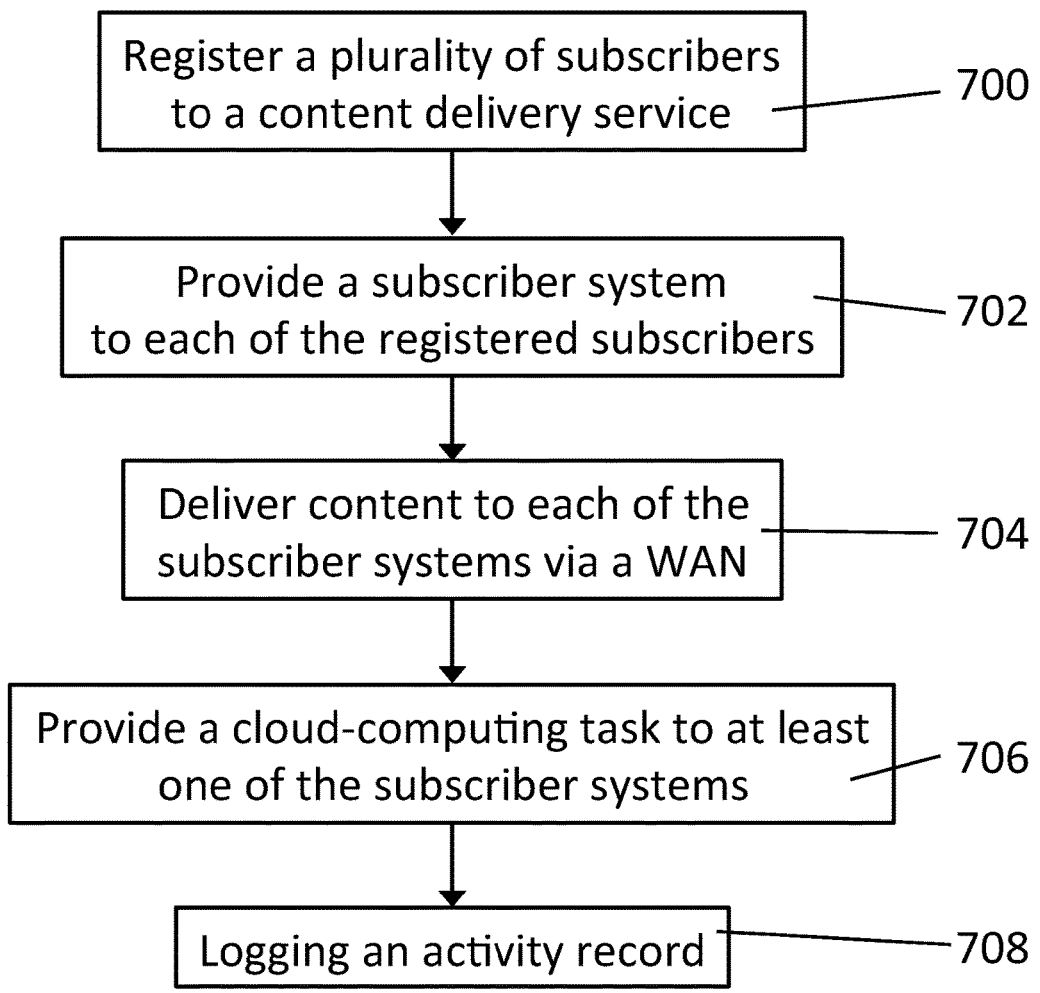
FIG. 7 is a simplified flow diagram for another method according to an embodiment of the invention.

Referring now to FIG. 7, shown is a simplified flow diagram for a method according to an embodiment of the invention. At 700 a plurality of subscribers is registered to a content delivery service. Registering optionally includes signing each of the subscribers to a fixed-term contract or to a month-to-month contract. At 702, for each registered subscriber, the content delivery service provides a subscriber system at a location that is associated with the subscriber. For instance, the subscriber system is provided at the subscriber's residence and is coupled to a Wide Area Network (WAN), such as for instance via an asymmetric digital subscriber line. The provided subscriber system comprises at least one of a processing resource and a non-volatile storage resource for use in providing the content delivery service. At 704 content is delivered to each subscriber system in accordance with the content delivery service. In particular, delivering content comprises providing data relating to the content delivery service to each subscriber system via the WAN and according to a first security protocol. In this specific and non-limiting example the content delivery service provider is also a cloud-computing provider or a cloud-computing broker. Optionally, the content delivery service provider is also an Internet service provider. Alternatively, the cloud-computing provider (broker), the content deliver service provider and the Internet service provider are separate entities.

At 706 a cloud-computing task is provided to at least one of the subscriber systems. In this example, the step of providing the cloud-computing task comprises determining at least one subscriber system having a sufficient amount of the at least one of the processing resource and the non-volatile storage resource available to execute the cloud-computing task. Cloud-computing task data are then provided to the at least one subscriber system via the WAN and according to a second security protocol. Upon completion of the cloud-computing task, at 708 an activity record is logged. Optionally, logging an activity record includes invoicing for execution of the cloud-computing task based on an amount of the available portion of the at least one of the processing resource and the non-volatile storage resource that is consumed during execution of the cloud computing task. The invoicing is to other than a subscriber associated with the at least one of the subscriber systems, e.g., to Client_1 or Client_2 in FIG. 2 or 3.

The implementation of an embodiment of the present invention, as described in detail with reference to one or more of FIGS. 2-7, supports utilization for cloud-computing purposes of otherwise underused processing and/or storage resources of consumer electronic devices that have another primary purpose. In the specific examples that have been discussed herein, the primary purpose of the consumer electronic devices is to provide a subscriber service or a content delivery service, such as for instance an IPTV service. As new subscribers are added to the service, additional devices are deployed and the total resources that are available grows over time. The devices, such as for instance set top boxes, may be provided to the subscribers free of charge and the cost is recovered over time by selling the underused resources to cloud-computing clients. Alternatively, the subscribers pay a fee when the set top box is installed and then credits are applied over time when the underused resources are sold to cloud-computing clients. The fee that is paid when the set top box is installed may or may not be subsidized by the provider.

In the implementations that are described with reference to FIGS. 2-7, the consumer electronic devices, e.g., set top boxes or "subscriber systems," are installed in unsecured locations associated with corresponding users or subscribers, e.g., in the users' or subscribers' living room, etc. The devices typically are distributed over a relatively large geographic region, such as for instance a region that is serviced by a single provider of a subscriber service. The devices may be owned by the individual subscribers, by the provider of the subscriber service, by the provider of another service such as for instance an Internet service provider, etc. Additionally, a broker system may coordinate the distribution of tasks to devices that are associated with one or more subscriber services. Optionally, subscribers are permitted to opt out of receiving cloud-computing tasks, or to define criteria for restricting the time of day or frequency of receiving cloud-computing tasks.

Another implementation of an embodiment of the present invention will now be described in detail, with specific reference to FIGS. 8-12. In particular, the subscriber systems in the following implementation are distributed over a relatively smaller geographic area. More particularly, the subscriber systems are connected via a LAN, which is established within a property such as for instance a multi-unit property. Some specific and non-limiting examples of multi-unit properties include a hotel, a rental apartment building, a condominium complex, a university campus, a hospital, or a corporate campus, etc. Depending on the type of the property, the subscriber systems may be a provided in the form of a set top box or a similar consumer electronic device, or alternatively in the form of a general-purpose computer or the like.

Figure 8:
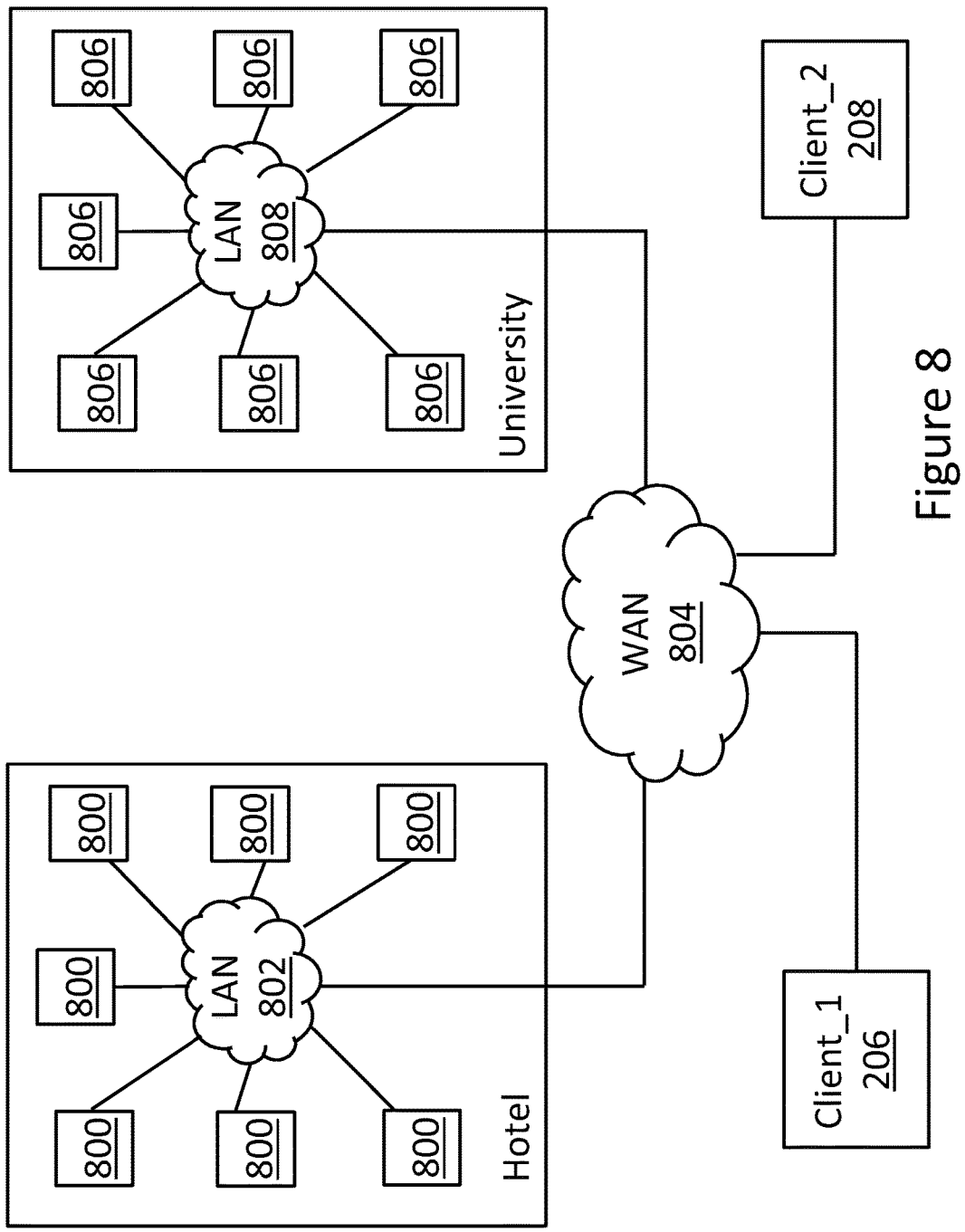
FIG. 8 is a simplified diagram showing a cloud computing system according to an embodiment of the invention.

Referring now to FIG. 8, shown is a simplified diagram of a cloud computing system in accordance with an embodiment of the invention. A plurality of subscriber systems 800, such as for instance set top boxes, is connected to Local Area Network (LAN) 802. In this example the LAN 802 is disposed within a multi-unit property, more particularly a hotel. Each of the subscriber systems 800 is disposed in a different unit of the multi-unit property, such as for instance within a different guest room of the hotel. The subscriber systems 800 have a primary function, which in this specific example is providing access to a subscriber service such as for instance a video on demand (VOD) service that is offered to the guests of the hotel. The LAN 802 is also connected to Wide Area Network (WAN) 804, via a known data communication technology, such as for instance an asymmetric digital subscriber line. A second property, such as for instance a university campus, is also shown in FIG. 8. The second property is similar to the hotel and comprises a plurality of second subscriber systems 806 connected to a second LAN 808, the second LAN 808 also being connected to WAN 804 via a known data communication technology. In this example, the subscriber systems 800 and the second subscriber systems 806 optionally have different primary functions and/or comprise different processing and/or non-volatile storage resources.

A first user system (Client_1) 206 and a second user system (Client_2) 208 are also coupled to the WAN 804. In the interest of clarity, various known components of the LAN 802 and of the communication systems through which the consumer electronic devices 800 connect to the LAN 802 are not shown in FIG. 8. Similarly, various known components of the LAN 808 and of the communication systems through which the consumer electronic devices 806 connect to the LAN 808 are not shown in FIG. 8. Further, various known components of the WAN 804 and of the communication systems through which the LANs 802 and 808 and the user systems 206 and 208 connect to the WAN 804, also are not shown in FIG. 8.

In the system that is shown in FIG. 8 it is assumed that the content delivery service that is provided within the hotel is an Internet Protocol TV (IPTV) service or VOD service, and the subscriber systems 800 are set-top boxes (STBs) installed in each hotel guest room. The primary function of the subscriber systems 800 is receiving media content via LAN 802, the media content for being displayed via a television or other similar device. As discussed supra with reference to FIG. 2, a STB typically is an embedded PC with a processor and memory capable of decoding MPEG-2 or MPEG-4 encoded video, or video that is encoded using other codecs e.g., H.264 or H.265 etc., and simultaneously capable of dealing with the processor overhead relating to enforced encryption, etc. The duty of presenting the program guide and acting on input events from a user are small compared to the STB primary duties, i.e., digital signal processing. Optionally, the subscriber systems 800 supports other content delivery services, such as for instance full web browser HTML and HTML5 service, either in addition to or instead of supporting the IPTV or VOD service. In the case of the university, it is assumed that the subscriber systems 806 are workstations or similar general purpose computers located on the university campus, such as for instance in a library, a reading room, a computer lab or an administrative office, etc. Optionally, the subscriber systems 806 include different types of devices, such as for instance the above-mentioned workstations as well as STBs that are disposed in dormitory rooms on the university campus. In the cases of both the hotel and the university, the subscriber systems 800 and 806 respectively are provided by a first entity and have a primary function that is performed for the first entity. The subscriber systems 800 and 806 have processing and/or storage resources that are not fully utilized during performance of the primary function and/or are not utilized continuously.

Figure 9:
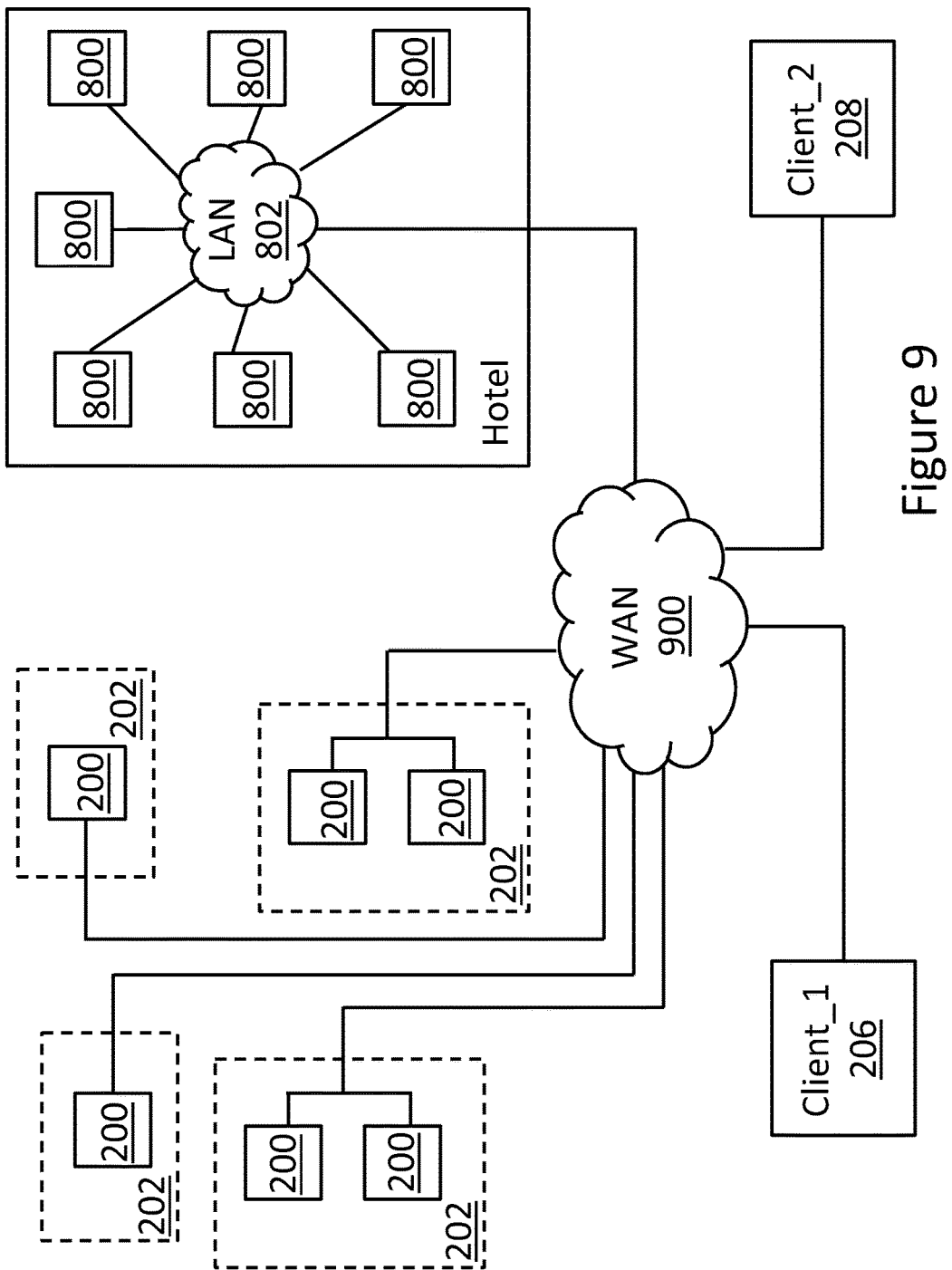
FIG. 9 is a simplified diagram showing a variant of the system of FIG. 8.

Referring now to FIG. 9, shown is a simplified diagram of a variant of the cloud computing system of FIG. 8. The system of FIG. 9 is a hybrid system combining features of the systems that are shown in FIG. 2 and in FIG. 8. Each one of a plurality of subscribers to a content delivery service is provided with a subscriber system 200, which is disposed at a location associated with the subscriber. Optionally, some locations are provided with a plurality of subscriber systems 200, for instance to support different content delivery services or to support plural subscribers located at a same location. Each of the subscriber systems 200 is connected to Wide Area Network (WAN) 900, via a known data communication technology, such as for instance an asymmetric digital subscriber line. Additionally, a plurality of subscriber systems 800, such as for instance set top boxes, is connected to Local Area Network (LAN) 802. In this example the LAN 802 is within a multi-unit property, more particularly a hotel. Each of the subscriber systems 800 is disposed in a different unit of the multi-unit property, such as for instance within a different guest room of the hotel. The subscriber systems 800 perform a primary function, such as for instance providing access to a subscriber service in the form of a video on demand (VOD) service that is offered to guests of the hotel. The LAN 802 is connected to Wide Area Network (WAN) 900, via a known data communication technology, such as for instance an asymmetric digital subscriber line.

A first user system (Client_1) 206 and a second user system (Client_2) 208 are also coupled to the WAN 900. In the interest of clarity, various known components of the WAN 900 and of the communication systems through which the subscriber systems 200, the LAN 802, and the user systems 206 and 208 connect to the WAN 900 are not shown in FIG. 9. Similarly, various known components of the LAN 802 and of the communication systems through which the subscriber systems 800 connect to the LAN 802 also are not shown in FIG. 9.

In the systems that are illustrated in FIGS. 8 and 9, the subscriber systems 800 or 806 are associated with a property and are connected to a LAN 802 or 808, respectively, so as to form a block of processing and/or non-volatile storage resources. The subscriber systems are provided by a first entity, such as for instance a property manager, and perform a first function for the first entity. A resource allocator is provided for determining an amount of a processing and/or non-volatile storage resource that is available within the block and that is not currently being utilized for performing the primary function. When a request is received from a client system 206 or 208 via the WAN 804 or 900, then the resource allocator provides to one or more of the subscriber systems 800 or 806 a task based on the request, the task to be performed using a portion of the available resources. The resource allocator subsequently coordinates delivery of a result of performing the task to the client system 206 or 208, via the WAN 804 or 900. Optionally, the resource allocator comprises a scheduling module that is dedicated to providing or scheduling the task based on the request, and a results tabulator that is dedicated to coordinating the delivery of the result of performing the task.

Additionally, the resource allocator logs an activity record for the performing of the task in dependence upon the portion of the available resource that is consumed during performing the task. Logging the activity record includes measuring an amount of the available resource that is consumed during performing of the task and storing a value indicative of the measured amount of the resource that is consumed. Invoicing to a client includes retrieving the stored value and additionally aggregating the measured amount of the resource that is consumed in performing tasks for the client over a period of time or over different geographic regions. The resource allocator optionally is provided on a not illustrated server that is connected to LAN 802 or 808, or the resource allocator is distributed across a plurality of the client systems 800 or 806.

Optionally, a not-illustrated broker system is connected to WAN 804 or 900. Requests from client system 206 or 208 are provided to the broker system, and then passed to subscriber systems via the WAN 804 or 900. With reference to FIG. 9, the broker system may provide tasks that involve the processing or storage of relatively small amounts of data to individual subscriber devices 200, and provide tasks that involve the processing or storage of relatively large amounts of data to the resource blocks that comprise the subscriber devices 800. Optionally, once a task is passed off to the subscriber devices 800 an internal mechanism on the LAN 802 performs necessary load balancing and ensures redundancy in the storage of data, etc. Further optionally, a hotel chain or another similar organization provides cloud-computing services using the processing and/or storage resources of subscriber systems that are disposed at different locations. For instance, a hotel chain may have properties in several cities or even in several hundred cities around the world. Unused processing and/or storage resources associated with subscriber systems at different properties may be centrally managed, or may be managed locally or within predefined regions to provide cloud-computing services in a geo-distributed fashion.

Figure 10:
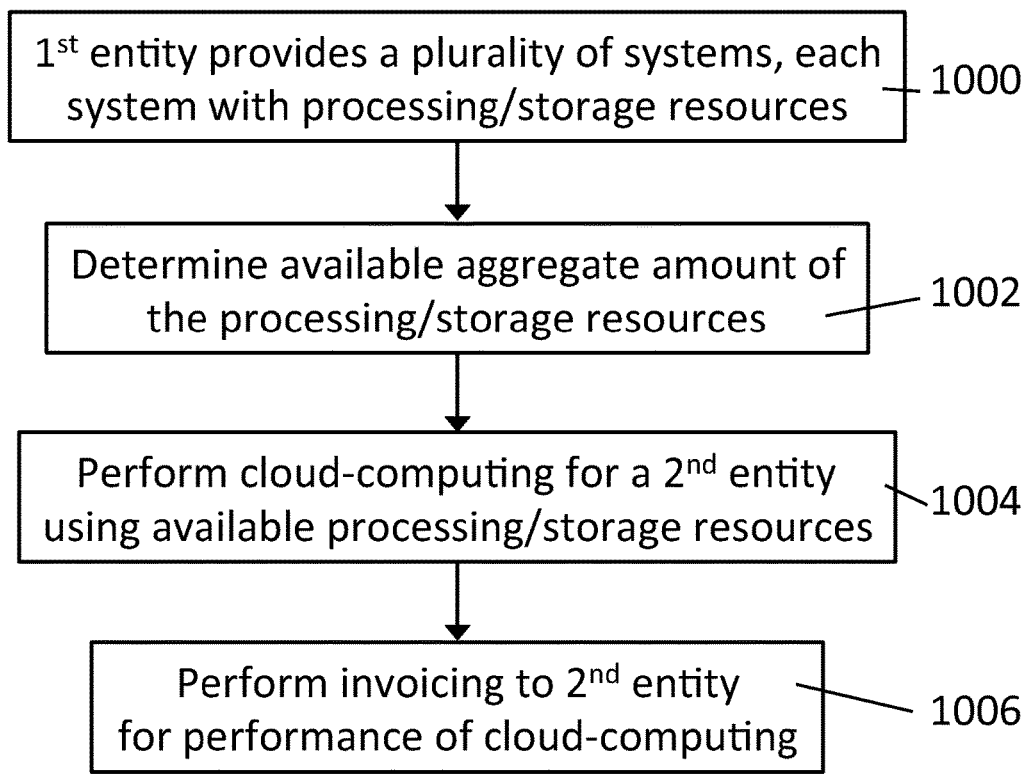
FIG. 10 is a simplified flow diagram for a method according to an embodiment of the invention.

Referring now to FIG. 10, shown is a simplified flow diagram for a method according to an embodiment of the invention. At 1000 a first entity provides a plurality of systems. Each of the provided systems comprises at least one of a processing resource and a non-volatile storage resource, and each of the provided systems has a primary function other than providing a cloud-computing service to a second entity. Further, each of the provided systems is disposed within a property, such as for instance within a hotel or a similar multi-unit property. By way of a specific and non-limiting example, each of the provided systems is a set top box (STB) that is disposed within a guest room of the hotel for receiving content via a local area network (LAN) in accordance with a subscriber service and for displaying the received content to a subscriber via a television or other similar device. In this implementation, the term "subscriber" refers to a hotel guest associated temporarily with a guest room within which the subscriber system is disposed. Using a remote control or another similar device, the room guest selects content for delivery to the subscriber system in accordance with the subscriber service. The selected content may be included in the room rate or it may incur an additional charge to be paid by the room guest. At 1002 a determination is made of an available aggregate amount of the at least one of the processing resource and the non-volatile storage resource that is other than being used by the plurality of systems for performing the primary function. At 1004 a cloud-computing service is performed for a second entity, using at least a portion of the available aggregate amount of the at least one of the processing resource and the non-volatile storage resource. At 1006 invoicing to the second entity is performed for the performance of the cloud-computing service, the invoicing based on an amount of the available aggregate amount of the at least one of the processing resource and the non-volatile storage resource consumed during performance of the cloud-computing service.

Figure 11:
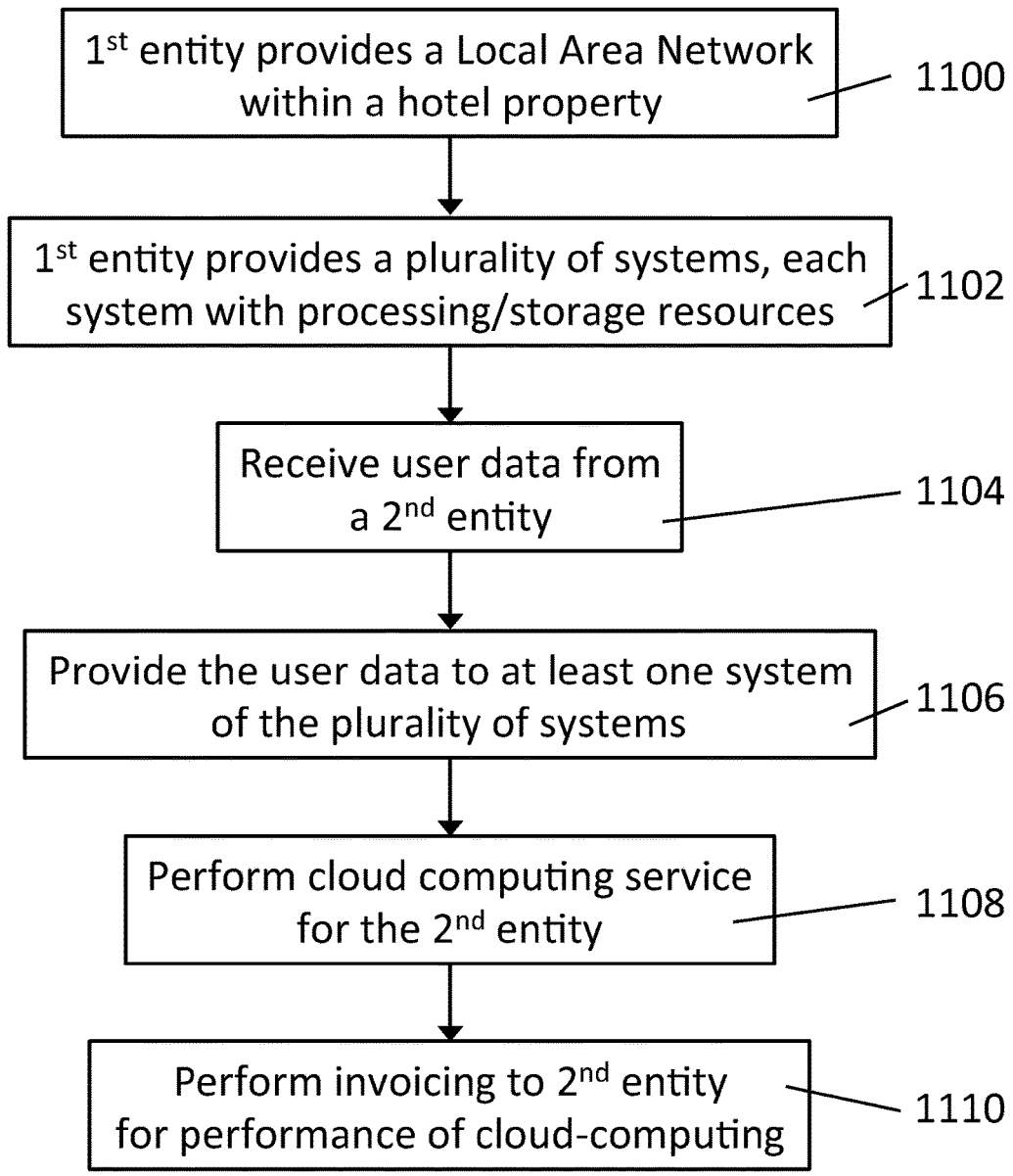
FIG. 11 is a simplified flow diagram for another method according to an embodiment of the invention.

Referring now to FIG. 11, shown is a simplified flow diagram for a method according to an embodiment of the invention. At 1100 a first entity provides a Local Area Network (LAN) within a hotel property having a plurality of guest rooms, the LAN connected to a Wide Area Network (WAN). At 1102 the first entity provides a plurality of subscriber systems, comprising disposing a subscriber system within each guest room of the plurality of guest rooms. Each subscriber system is connected to the LAN and comprises at least one of a processing resource and a non-volatile storage resource. Further, each subscriber system has a primary function other than providing a cloud-computing service to a second entity. At 1104 user data are received from a second entity via the WAN. At 1106 the received user data are provided to at least one subscriber system of the plurality of subscriber systems via the LAN. At 1108 a cloud-computing service is performed for the second entity, comprising at least one of processing the user data and storing the user data using the at least one of the processing resource and the non-volatile storage resource of the at least one subscriber system. At 1110 invoicing to the second entity is performed for performance of the cloud-computing service, based on an amount of the at least one of the processing resource and the non-volatile storage resource consumed during performance of the cloud-computing service.

In the methods that are described with reference to FIGS. 10 and 11, the number of systems used to perform the cloud-computing service depends on a number of criteria, including the processing complexity and/or data storage requirement of the task, the amount of unused processing and/or storage resources available on each of the systems, whether or not the provided data are to be stored in a redundant fashion such as for instance using a RAID process, and how quickly the results of processing of the data are needed, etc. In an embodiment a resource allocator makes the determination of the available aggregate amount of the at least one of the processing resource and the non-volatile storage resource that is other than being used by the plurality of systems for performing the primary function. The resource allocator is implemented optionally on a separate server or in a distributed fashion on at least some systems of the plurality of systems. When a request is received from the second entity for a cloud-computing service, then the resource allocator provides to one or more of the systems a task based on the request, the task to be performed using a portion of the available resources. The resource allocator subsequently coordinates delivery of a result of performing the task to the second entity. Additionally, the resource allocator logs an activity record for the performing the task in dependence upon the portion of the available resource that is consumed. Logging the activity record includes measuring an amount of the available resource that is consumed during performing of the task and storing a value indicative of the measured amount of the resource that is consumed. Invoicing to the second entity includes retrieving the stored value and additionally aggregating the measured amount of the resource that is consumed in performing tasks for the second entity over a period of time or over different geographic regions.

Numerous other embodiments may be envisaged without departing from the scope of the present invention.

What is claimed is:
1. In a system comprising
   a plurality of subscriber systems provided by a first entity, each subscriber system being disposed at a different location, and each different location being associated with a different subscriber to a subscriber service that is provided by the first entity, each subscriber system of the plurality of subscriber systems comprising at least one of a processing resource and a non-volatile storage resource, each subscriber system of the plurality of subscriber systems in operative communication with a server system of a cloud-computing provider via a communication network, each subscriber system configured to perform a primary function of delivering the subscriber service that is provided by the first entity, and wherein the primary function is not providing a cloud-computing service to a second entity, and each subscriber system performing its primary function of delivering the subscriber service to an associated subscriber, wherein the associated subscriber is not the first entity or the second entity, a method comprising;
   accessing the plurality of subscriber systems by the cloud-computing provider to determine an available aggregate amount of the at least one of the processing resource and the non-volatile storage resource that is not being used by at least two subscriber systems of the plurality of subscriber systems for performing the primary function;
   adding to the at least two subscriber systems of the plurality of subscriber systems, via the communication network, a task comprising the cloud-computing service requested by the second entity;
   performing the cloud-computing service for the second entity using at least a portion of the available aggregate amount of the at least one of the processing resource and the non-volatile storage resource that is not being used by the at least two subscriber systems of the plurality of subscriber systems, wherein at least one of the at least two subscriber systems of the plurality of subscriber systems performs the primary function thereof during a first period of time, and wherein the cloud-computing service is performed during a second period of time that at least partially overlaps with the first period of time;
   receiving from the at least two subscriber systems of the plurality of subscriber systems, via the communication network, a result of executing the task; and
   logging an activity record for performance of the cloud-computing service based on an amount of the available aggregate amount of the at least one of the processing resource and the non-volatile storage resource consumed during performance of the cloud-computing service.

2. The method according to claim 1 wherein each subscriber system of the plurality of subscriber systems is connected to a Local Area Network (LAN), and wherein the LAN is connected to a Wide Area Network (WAN), and wherein the LAN and the WAN are portions of the communication network.

3. The method according to claim 2 comprising receiving data from the second entity via the WAN, the data for being one of processed using the processing resources of the plurality of subscriber systems and stored using the non-volatile storage resource of the plurality of subscriber systems.

4. The method according to claim 3 comprising storing the data that are received from the second entity using the non-volatile storage resource of the plurality of subscriber systems, wherein the data that are received from the second entity are stored in accordance with a first security protocol and wherein other data relating to the primary functions of the subscriber systems are stored in accordance with a second security protocol.

5. The method according to claim 3 wherein an amount of the data that are received from the second entity exceeds a storage capacity of the non-volatile storage resource of any one of the subscriber systems of the plurality of subscriber systems, and comprising:
determining a subset of the subscriber systems having, in aggregate, an available amount of non-volatile storage resource that is sufficient to store the received data; and
storing the received data in the non-volatile storage resource of the subscriber systems of the subset of subscriber systems, comprising storing in each of the non-volatile storage resources a portion of the received data.

6. The method according to claim 1 wherein some of the subscriber systems are connected to a first Local Area Network (LAN) and others of the subscriber systems are connected to a second LAN, and wherein the first LAN and the second LAN are both connected to a Wide Area Network (WAN), and wherein the first LAN, the second LAN and the WAN are portions of the communication network.

7. The method according to claim 6 comprising receiving data from the second entity via the WAN, the data for being one of processed using the processing resources of the plurality of subscriber systems and stored using the non-volatile storage resource of the plurality of subscriber systems.

8. The method according to claim 7 comprising storing the data that are received from the second entity using the non-volatile storage resource of the plurality of subscriber systems, wherein the data that are received from the second entity are stored in accordance with a first security protocol and wherein other data relating to the primary functions of the subscriber systems are stored in accordance with a second security protocol.

9. The method according to claim 7 wherein an amount of the data that are received from the second entity exceeds a storage capacity of the non-volatile storage resource of any one of the subscriber systems of the plurality of subscriber systems, and comprising:
determining a subset of the subscriber systems having, in aggregate, an available amount of non-volatile storage resource that is sufficient to store the received data; and
storing the received data in the non-volatile storage resource of the subscriber systems of the subset of subscriber systems, comprising storing in each of the non-volatile storage resources a portion of the received data.

10. The method according to claim 1 wherein the subscriber service is an Internet Protocol Television (IPTV) service.

11. The method according to claim 1 wherein the subscriber service is a web browser HTML and HTML5 service.

12. The method according to claim 1 wherein the primary function of at least some subscriber systems of the plurality of subscriber systems is providing linear television programming to the user that is associated therewith.

13. The method according to claim 1 wherein the primary function of at least some subscriber systems of the plurality of subscriber systems is providing hotel guest services to the user that is associated therewith.

14. The method according to claim 1 wherein the primary function of at least some subscriber systems of the plurality of subscriber systems is providing hospital patient and/or physician services to the user that is associated therewith.

15. The method according to claim 1 comprising measuring by a resource allocator the utilization of the available aggregate amount of the at least one of the processing resource and the non-volatile storage resource during performance of the cloud-computing service for the second entity.

16. The method according to claim 15 comprising storing a value indicative of the measured utilization, the stored value for use in the invoicing to the second entity for performance of the cloud-computing service.

17. The method according to claim 16 wherein the resource allocator is implemented using at least some subscriber systems of the plurality of subscriber systems, and wherein storing the value comprises storing the value in the non-volatile storage resource of at least one of the at least some subscriber systems.

18. In a system comprising
a Local Area Network (LAN) provided by a first entity within a hotel property having a plurality of guest rooms, the LAN connected to a Wide Area Network (WAN), and
a plurality of subscriber systems provided by the first entity, each subscriber system disposed within a different guest room of the plurality of guest rooms, each subscriber system connected to the LAN and comprising at least one of a processing resource and a non-volatile storage resource, each subscriber system configured to perform a primary function of providing a subscriber service to a user that is associated therewith, and wherein the primary function is not providing a cloud-computing service to a second entity, and wherein the associated user is not the first entity or the second entity a method comprising:
receiving user data from the second entity via the WAN;
accessing the plurality of subscriber systems by a cloud-computing provider to determine an available aggregate amount of the at least one of the processing resource and the non-volatile storage resource that is not being used by at least two subscriber systems of the plurality of subscriber systems for performing the primary function;
adding the received user data to the at least two subscriber systems of the plurality of subscriber systems via the LAN;
performing a cloud-computing service for the second entity comprising at least one of processing the user data and storing the user data using at least a portion of an available amount of the at least one of the processing resource and the non-volatile storage resource of each one of the at least two subscriber systems, wherein at least one of the at least two subscriber systems performs the primary function thereof during a first period of time, and wherein the cloud-computing service is performed during a second period of time that at least partially overlaps with the first period of time; and logging an activity record for performance of the cloud-computing service based on an amount of the at least one of the processing resource and the non-volatile storage resource consumed during performance of the cloud-computing service.

19. The method according to claim 18 wherein the subscriber service is an Internet Protocol Television (IPTV) service.

20. The method according to claim 18 wherein the subscriber service is a web browser HTML and HTML5 service.

21. The method according to claim 18 wherein the subscriber service is a linear television programming service.

22. The method according to claim 18 wherein the subscriber service is a hotel guest service.

23. The method according to claim 18 comprising measuring by a resource allocator the utilization of the at least one of the processing resource and the non-volatile storage resource of the at least two subscriber systems during performance of the cloud-computing service for the second entity.

24. The method according to claim 23 comprising storing a value indicative of the measured utilization, the stored value for use in logging the activity record.

25. The method according to claim 24 wherein the resource allocator is implemented using at least some subscriber systems of the plurality of subscriber systems, and wherein storing the value comprises storing the value in the non-volatile storage resource of at least one of the at least some subscriber systems.

* * * * *